United States Patent
Harnasch

(10) Patent No.: US 12,312,206 B2
(45) Date of Patent: May 27, 2025

(54) APPARATUS FOR REMOVING FLEXIBLE FILAMENT FROM A SPOOL

(71) Applicant: Raul Harnasch, Ephrata, WA (US)

(72) Inventor: Raul Harnasch, Ephrata, WA (US)

( * ) Notice: Subject to any disclaimer, the term of this patent is extended or adjusted under 35 U.S.C. 154(b) by 300 days.

(21) Appl. No.: 18/124,941

(22) Filed: Mar. 22, 2023

(65) Prior Publication Data

US 2024/0317539 A1    Sep. 26, 2024

(51) Int. Cl.
| | | |
|---|---|---|
| *B65H 75/00* | (2006.01) | |
| *B65H 75/14* | (2006.01) | |
| *B65H 75/22* | (2006.01) | |
| *B65H 75/30* | (2006.01) | |

(52) U.S. Cl.
CPC ......... *B65H 75/14* (2013.01); *B65H 75/2245* (2021.05); *B65H 75/305* (2013.01)

(58) Field of Classification Search
CPC .. B65H 75/14; B65H 75/2245; B65H 75/305; B65H 75/2227; B65H 75/28
See application file for complete search history.

(56) References Cited

U.S. PATENT DOCUMENTS

| | | | | |
|---|---|---|---|---|
| 2,518,533 A | * | 8/1950 | Edwards | B65H 75/2227 242/118.5 |
| 3,971,526 A | * | 7/1976 | Underwood | B65H 75/14 242/118.6 |
| 4,196,864 A | * | 4/1980 | Cole | A01K 89/003 242/608.5 |
| 4,269,371 A | * | 5/1981 | Kovaleski | B65H 75/2263 242/118.6 |
| 6,015,111 A | * | 1/2000 | Berke | B65H 75/2245 242/390.8 |
| 6,102,319 A | * | 8/2000 | Annabel | B65H 75/148 242/125.1 |
| 6,648,262 B1 | * | 11/2003 | Huffman | B65H 75/305 242/390.8 |
| 6,857,590 B2 | * | 2/2005 | Heesch | A01K 89/0111 242/586 |
| 7,198,222 B2 | * | 4/2007 | Rydalch | B65H 75/305 242/608.4 |
| 8,827,198 B1 | * | 9/2014 | Steadman, Sr. | B65H 75/305 242/613.2 |
| 11,129,374 B2 | * | 9/2021 | Jaramillo | A01K 89/01931 |
| 11,191,259 B1 | * | 12/2021 | Nevius | A41D 19/0041 |
| 2011/0240791 A1 | * | 10/2011 | Lindley | B65H 75/14 242/609 |
| 2019/0248620 A1 | * | 8/2019 | Lagace | B65H 75/2218 |

FOREIGN PATENT DOCUMENTS

EP         2479131 A2 *  7/2012   ............. B65H 75/14

* cited by examiner

*Primary Examiner* — Emmanuel M Marcelo
(74) *Attorney, Agent, or Firm* — Randall Danskin P.S.

(57) ABSTRACT

An apparatus for removing flexible filament from a spool. The apparatus includes a spool body and an end cap with a tension arm. It is designed to be inserted into a drill chuck and filament like fishing line is wound about the spool body and tension arm. After the line is wound, the end cap and tension arm piece is removed from the spool body and the line is removed.

8 Claims, 4 Drawing Sheets

APPARATUS FOR REMOVING FLEXIBLE FILAMENT FROM A SPOOL

TECHNICAL FIELD

The present application relates generally to an apparatus for removing flexible filament from a spool and related methods. More particularly, the present application relates to an apparatus for removing fishing line from a fishing line spool and collecting the removed fishing line into a manageable mass that is easily removed from the apparatus and is compacted and/or condensed into a manageable mass of fishing line.

BACKGROUND

As used throughout this application, the term "filament" is defined as a fine or thinly spun thread, fiber, line, or wire and the term "line" is defined as a cable, rope, string, cord or wire.

The known prior art discloses a body with two conical pieces that connect and come apart at the narrowest part in the middle, as shown in U.S. Pat. No. 6,102,319. The two pieces are held together with a threaded wingnut at one end and connected to a power drill at the other end. The power drill is used to wind fishing line around the narrow connection point where the two conical pieces meet. After the fishing line is wound, the wingnut is removed and the conical pieces are separated from one another. Experience has shown that it is difficult to remove the fishing line from this type of device and it is too big and bulky.

Another known prior art discloses a tapered shaft between two large hubs, as shown in U.S. Pat. No. 6,648,262. One of the hubs threadedly engages with the tapered shaft. Experience has shown that it is difficult to remove fishing line from this type of device and it is too big and bulky.

Other known prior art discloses a cylindrical body upon which a fishing line is wound, but once the fishing line is wound upon the generally cylindrical body it is difficult to remove from the body.

Another known prior art discloses a tool for opening fiber-optic cables, as shown in U.S. Pat. No. 7,198,222. This device includes a first part with a shank for engaging with the chuck of a power drill, a very large flange, and female threads for receiving a male threaded component. The device includes a second part with a second very large flange, a shoulder or column section, and the male threaded component for engagement with the threaded portion of the first part. This device was designed to open a cable having a filament disposed within a sheath, which is very different from winding unsheathed filament such as fishing line.

Therefore, an apparatus for removing filament from a spool, such as fishing line from a reel, which overcomes and avoids the short-comings attendant with the prior art devices and practices utilized heretofore is the subject matter of the present application.

SUMMARY

According to one aspect, an apparatus for removing filament from a reel includes a cylindrically shaped spool body having two ends opposite each other. The spool body includes a hole extending radially inward through the outer circumferential surface. At one end of the spool body, a shank extends coaxially with the central axis of the cylindrical spool body. The shank is designed to engage with the chuck of a drill. The apparatus also includes a second component known as a second end cap. The second end cap is designed to removably interconnectable with the spool body at the end opposite the shank. The second end cap includes a cylindrical component with an inner circumferential surface and an outer circumferential surface and a cavity defined by the inner circumferential surface. The end of the spool body fits into the cavity of the second end cap. The second end cap is fixedly interconnected with an elongate tension arm that sits adjacent to the outer circumferential surface of the spool body when the second end cap is connected to the spool body. The elongate tension arm runs the entire length of the spool body.

In some embodiments, a flange extends radially outward from the outer circumferential surface of the second end cap. In some embodiments, a body flange extends radially outward from the outer circumferential surface of the spool body. In some embodiments, the body flange is located on the body between the first end and the hole.

According to another aspect, a method for removing filament from a reel includes providing a reel with an amount of filament thereon. The method uses the device as shown and described herein. The second end cap is connected with the second end of the body, by inserting the second end of the body into the cavity of the second end cap such that the elongate tension arm fixedly interconnected to the second end cap is spacedly adjacent to the outer circumferential surface of the body. The end of the filament to be removed from the reel is inserted into the line hole. The spool body is rotated about the central axis several rotations so as to wind the filament from the reel around and about the outer circumferential surface of the spool body and simultaneously over and about the elongate tension arm that is positioned spacedly adjacent to the outer circumferential surface of the spool body. When the filament has been removed from the reel and on to the spool body, the second end cap and the elongate tension arm fixedly interconnected thereto are disconnected from the second end of the spool body and the filament is removed from the spool body.

In some embodiments, the shank is functionally engaged with the chuck of a drill and the drill is actuated to cause the spool body to rotate about the central axis and wind the filament from the reel around and about the outer circumferential surface of the spool body and simultaneously over and about the elongate tension arm that is positioned spacedly adjacent to the outer circumferential surface of the spool body. In some embodiments, the filament is severed after the desired amount has been wound onto the spool body. In some embodiments, when removing the filament from the spool body, the filament is removed from the spool body in an axial direction toward the spool body second end and away from the shank.

The foregoing is intended to be illustrative and not meant in a limiting sense. Many possible embodiments may be made and will be readily evident upon a study of the entire specification and accompanying drawings comprising a part thereof. Various features and subcombinations may be employed without reference to other features and subcombinations. Benefits will become apparent from the description set forth in this specification taken in connection with the accompanying drawings, wherein is set forth by way of illustration and example, one or more embodiment(s) of the present concept and various features thereof.

BRIEF DESCRIPTION OF THE FIGURES

One or more embodiments are shown in the drawings. The drawings are not intended to limit the scope of the invention or claims in any way. The drawings shall be interpreted as illustrative and not in a limiting sense.

FIG. 1 is a perspective view of an apparatus for removing filament from a reel.

DETAILED DESCRIPTION

In compliance with U.S. statutes, the apparatus is disclosed herein and described in detail; however, it is to be understood that the disclosed embodiment(s) are merely examples, which may be embodied in various forms. Therefore, specific structural and functional details disclosed herein are not to be interpreted as limiting, but merely as a basis for understanding the claims and as a representative basis for teaching one skilled in the art to variously employ the features claimed in virtually any appropriate structure.

Figure 1:
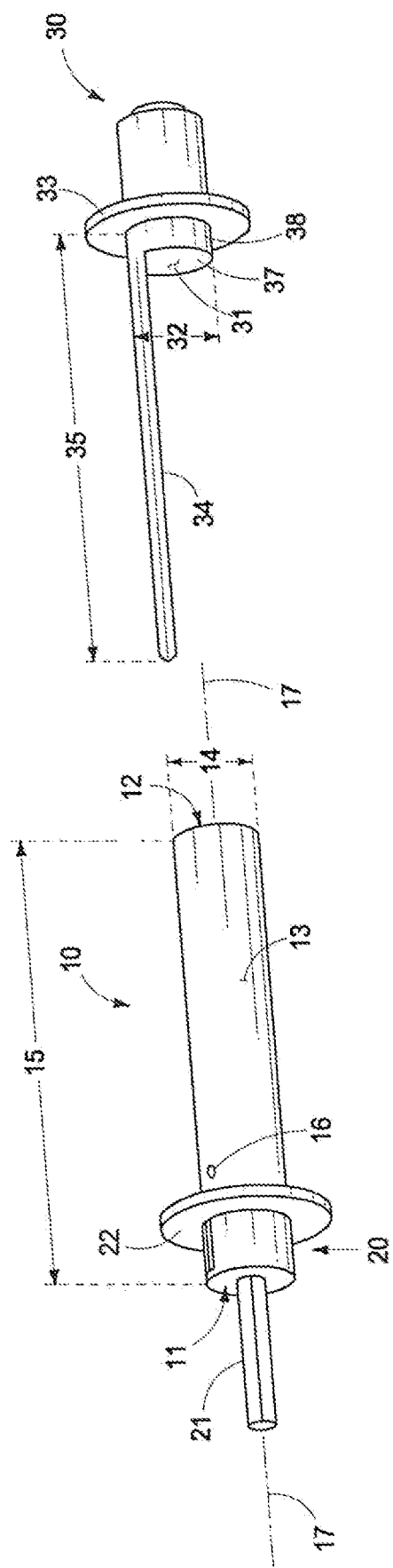

Referring to FIG. 1, an apparatus for removing filament from a reel is shown. The apparatus includes a spool body 10. The spool body 10 is generally cylindrical in shape. The spool body 10 has a first end 11 and a second end 12. The first end 11 and the second end 12 are opposite each other. The spool body 10 also has an outer circumferential surface 13, a diameter 14, and a length 15. The spool body 10 has a central axis 17 extending through the first end 11 and the second end 12. The spool body also includes a hole 16 extending radially inward through the outer circumferential surface 13.

The spool body 10 further includes a shank 21 extending outwardly axially relative to the first end 11 of the spool body 10. The shank 21 is sized and shaped to functionally communicate with the chuck of a drill. In some embodiments, for example, and not by way of limitation, the shank 21 has a cross-section that is round, square, triangular, hexagonal, or other shapes like the SDS family of drill bit shanks. In some embodiments, the shank 21 is threaded.

Still referring to FIG. 1, the apparatus also includes a second end cap 30. The second end cap 30 is sized and shaped to mate with and removably interconnect with the second end 12 of the spool body 10. The second end cap 30 includes a cylindrical portion that includes an inner circumferential surface 37 and an outer circumferential surface 38 opposite to the inner circumferential surface 37. The inner circumferential surface 37 and the second end cap 30 define a cavity 31. The cavity 31 has a diameter 32. The cavity 31 is sized and shaped to fit over and be mated with the second end 12 of the spool body 10. When mated, the cavity 31 envelops the second end 12 of the spool body 10 and at least a portion of the outer circumferential surface 13 of the spool body 10. When mated, the cavity 31 is coaxially aligned with the central axis 17 of the spool body 10. The diameter 32 of the cavity 31 is larger than the diameter 14 of the spool body 10. Preferably, the engagement is friction fitting as the diameter 32 of the cavity 31 is only slightly greater than the diameter 14 of the spool body 10.

The second end cap 30 is fixedly interconnected to an elongate tension arm 34. The elongate tension arm 34 has a length 35. When the second end cap 30 is mated with the second end 12 of the spool body 10, the elongate tension arm 34 is spacedly adjacent to the outer circumferential surface 13 of the spool body 10.

In the embodiment shown in FIG. 1, the spool body 10 includes a first end cap 20 located at the first end 11 of the spool body 10. The shank 21 extends outwardly from the first end cap 20. The spool body 10 also includes a body flange 22 extending radially outward from the outer circumferential surface 13 of the spool body 10. In the embodiment shown in FIG. 1, the second end cap 30 includes a second end cap flange 33 extending radially outward from the outer circumferential surface 38 of the second end cap 30. In some embodiments, such as that shown in FIG. 1, the body flange 22 and the second end cap flange 33 function to retain the filament winding between them until it is time for removal of the wound filament.

In use, the first end of the filament on the reel is inserted into the hole 16 which may, but need not, extend fully transversely through the body 10. In some embodiments, the body flange 22 is located on the spool body 10 between the first end 11 and the hole 16. In some embodiments, such as that shown in FIG. 1, the body flange 22 is located on the spool body 10 between the first end cap 20 and the hole 16.

Figure 2:
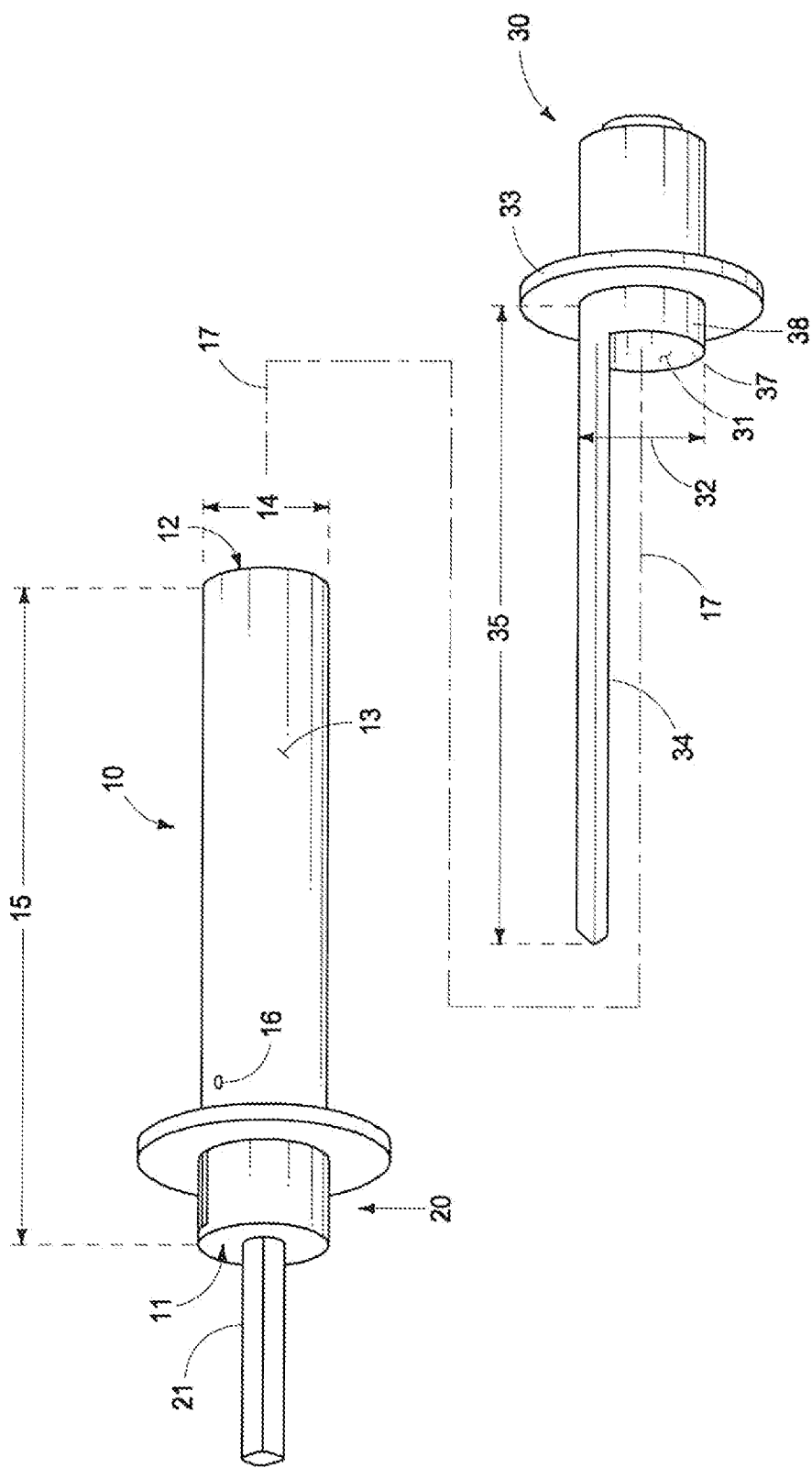
FIG. 2 is an exploded perspective view of an apparatus for removing filament from a reel.

Referring to FIG. 2, an exploded view of an apparatus for removing filament from a reel is shown. The apparatus shown in FIG. 2 is functionally equivalent to the apparatus shown and described with respect to FIG. 1.

Figure 3:
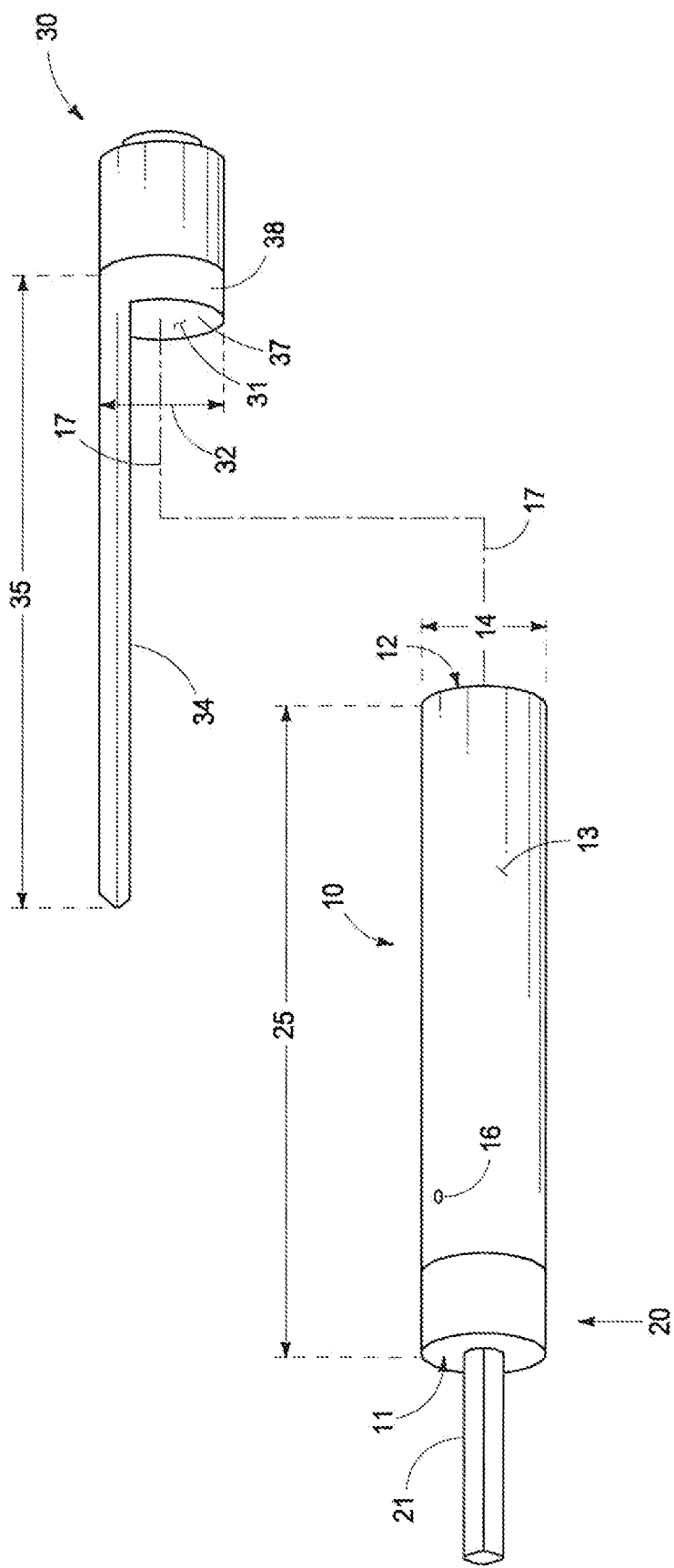
FIG. 3 is a perspective view of another embodiment of an apparatus for removing filament from a reel.

Referring to FIG. 3, another embodiment of an apparatus for removing filament from a reel is shown. The apparatus shown in FIG. 3 is functionally equivalent to those shown and described with respect to FIGS. 1 and 2, however, the embodiment shown in FIG. 3 does not include the body flange 22 or the second end cap flange 33. The embodiment shown in FIG. 3 has a smaller overall diameter than the embodiments shown in FIGS. 1 and 2. Without the body flange 22 and the second end cap flange 33, the apparatus may be tucked into a shirt pocket or otherwise stored more conveniently.

OPERATION

The operation of the described embodiment(s) of the present concept is believed to be readily apparent, and is briefly summarized at this point.

Figure 4:
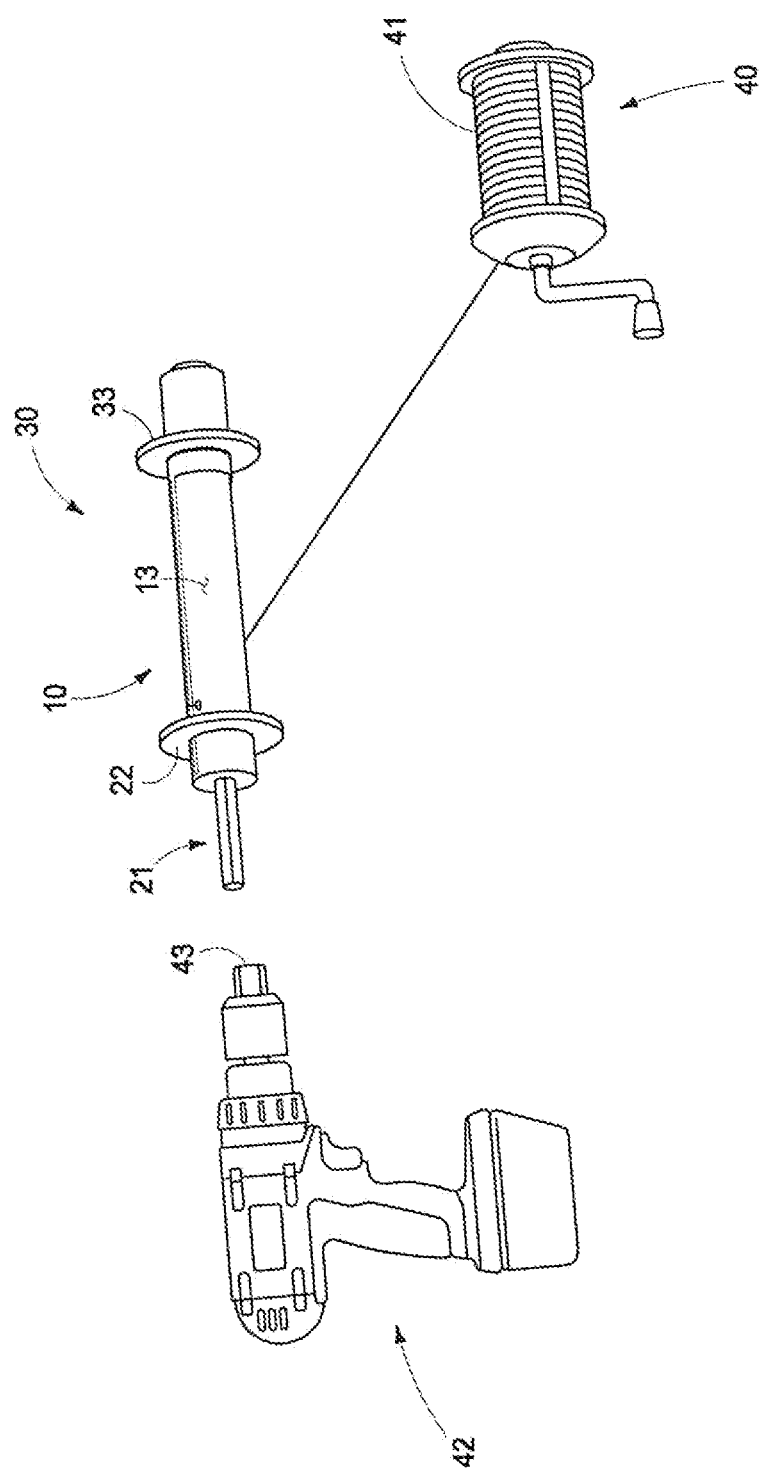
FIG. 4 is a perspective view of an apparatus for removing filament from a reel shown as used in some embodiments with a fishing reel and a power drill.

Referring to FIG. 4, as herein shown and described, an apparatus is provided for removing filament 41 from a reel 40. The reel 40 includes an amount of filament 41 thereon and wound circumferentially about the reel 40. It is desired that a portion of the filament 41 that is wound on the reel 40 be removed from the reel 40 with and onto the apparatus.

The second end cap 30 is mated with the second end 12 of the spool body 10, by inserting the second end 12 of the spool body 10 into the cavity 31 of the second end cap 30 such that the elongate tension arm 34 that is fixedly interconnected to the second end cap 30 is spacedly adjacent to the outer circumferential surface 13 of the spool body 10. The end portion of the filament 41 to be removed from the reel 40 is inserted into the hole 16.

The spool body 10 is rotated about the central axis 17 for several rotations so as to wind the amount of filament 41 to be removed from the reel 40 around and about the outer circumferential surface 13 of the spool body 10 and simultaneously over and about the elongate tension arm 34 that is positioned spacedly adjacent to the outer circumferential surface 13 of the spool body 10. When the amount of filament 41 to be removed from the reel 40 has been removed from the reel 40 and on to the spool body 10, the second end cap 30 and the elongate tension arm 34 fixedly interconnected thereto is disconnected from the second end 12 of the spool body 10. The filament 41 is removed from the spool body 10.

In some embodiments, such as that shown in FIG. 4, the shank 21 is functionally engaged with the chuck 43 of a drill 42. The drill 42 is actuated to cause the spool body 10 to rotate about the central axis 17 so as to wind the amount of filament 41 to be removed from the reel 40 around and about the outer circumferential surface 13 of the spool body 10 and simultaneously over and about the elongate tension arm 34 that is positioned spacedly adjacent to the outer circumferential surface 13 of the spool body 10. After the desired amount of filament 41 is wound about the spool body 10, the filament 41 is severed from the reel 40 and any filament 41 remaining on the reel 40. In some embodiments, when removing the amount of filament 41 from the spool body 10, the amount of filament 41 is removed from the spool body 10 in an axial direction toward the spool body 10 second end 12.

In use, the shank 21 is engaged with a chuck 43 carried by a drill 42. The chuck 43 is tightened upon the shank 21 so that as the power drill 42 is operated, the shank 21 and the attached first end cap 20 and the interconnected spool body 10 rotate in unison. The second end cap 30 is engaged with the second end 12 of the spool body 10 so that the second end 12 is axially inserted into the cavity 31. Sufficient axial pressure is exerted on the second end cap 30 to frictionally secure the second end cap 30 to the spool body 10. A length of filament 41 is at least partially removed from the fishing reel 40. A terminal end portion (not shown) of the filament 41 is inserted into the hole 16 defined in the spool body 10. A length of the filament 41 is wound about the outer circumferential surface 13 of the spool body 10, and the wound filament extends over the elongate tension arm 34 fixedly connected to the second end cap 30. Once several windings of the filament 41 is made, the power drill 42 is actuated so as to rapidly axially rotate the spool body 10 and attached end caps 20 and 30. Rotation of the spool body 10 draws the filament 41 from the reel at a high-speed. The filament 41 being wound upon the spool body 10 is concentrated in the area between the two flanges 22 and 33. When the desired amount of filament 41 has been removed from the reel 40, the power drill 42 is deactivated and the filament 41 may be severed at a desired location. The user then manually grasps the second end cap 30, and axially draws the second end cap 30 away from the second end portion 12 of the spool body 10. Removal of the second end cap 30 simultaneously removes the elongate tension arm 34 from under the wound bundle of removed filament 41. The removal of the elongate tension arm 34 provides a space between the wound filament 41 and the outer circumferential surface 13 of the spool body 10 which allows the bundle of removed filament 41 to be easily removed from the spool body 10 in an axial direction, toward the second end 12. The bundle of removed filament 41 is concentrated and condensed and is easily disposed of.

In compliance with the statute, the embodiments have been described in language more or less specific as to structural and methodical features. It is to be understood, however, that the embodiments are not limited to the specific features shown and described. The embodiments are, therefore, claimed in any of their forms or modifications within the proper scope of the appended claims appropriately interpreted in accordance with the doctrine of equivalents.

Finally, it will be appreciated that the purpose of the accompanying Abstract is to enable the patent offices and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the claims in any way.

What is claimed is:

1. An apparatus for removing filament from a reel comprising:
    a cylindrically shaped spool body with a first end and a second end opposite the first end, the body having a diameter, a length, a central axis extending through the first end and the second end, an outer circumferential surface, and a hole extending radially inward through the outer circumferential surface;
    a shank extending outwardly perpendicular to the first end of the body and coaxially with the axis of the body, the shank being sized and shaped for functional communication with a chuck;
    a second end cap that is sized and shaped to mate with and removably interconnect with the second end of the body, the second end cap having an inner circumferential surface and an opposing outer circumferential surface, and the inner circumferential surface of the second end cap defines a cavity, the cavity being sized and shaped such that when the second end cap is mated with the second end of the body, the cavity envelops the second end of the body and at least a portion of the outer circumferential surface of the body and the cavity coaxially aligns with the central axis of the body, the cavity having a diameter that is larger than the diameter of the body; and
    an elongate tension arm having a length and fixedly interconnected at one end with the second end cap, the elongate tension arm being sized and shaped such that when the second end cap is mated with the second end of the body, the elongate tension arm is spacedly adjacent to the outer circumferential surface of the body.

2. The apparatus of claim 1, further comprising:
    a second end cap flange extending radially outward from the outer circumferential surface of the second end cap.

3. The apparatus of claim 1, further comprising:
    a body flange extending radially outward from the outer circumferential surface of the body.

4. The apparatus of claim 3, wherein the body flange is located on the body between the first end and the hole.

5. A method for removing filament from a reel, the method comprising:
    providing a reel having an amount of filament thereon and wound circumferentially thereabout that is to be removed;
    providing an apparatus as claimed in claim 1;
    interconnecting the second end cap with the second end of the body, by inserting the second end of the body into the cavity of the second end cap such that the elongate tension arm fixedly interconnected to the second end cap is spacedly adjacent to the outer circumferential surface of the body;
    inserting an end portion of the amount of filament to be removed from the reel into the hole;
    rotating the spool body about the central axis for a plurality of rotations so as to wind the amount of filament to be removed from the reel around and about the outer circumferential surface of the spool body and simultaneously over and about the elongate tension arm that is positioned spacedly adjacent to the outer circumferential surface of the spool body;

when the amount of filament to be removed from the reel has been removed from the reel and on to the spool body, disconnecting the second end cap and the elongate tension arm fixedly interconnected thereto from the second end of the spool body; and removing the amount of filament from the spool body.

6. The method of claim 5, further comprising:

functionally engaging the shank with a chuck of a drill; and actuating the drill to cause the spool body to rotate about the central axis so as to wind the amount of filament to be removed from the reel around and about the outer circumferential surface of the spool body and simultaneously over and about the elongate tension arm that is positioned spacedly adjacent to the outer circumferential surface of the spool body.

7. The method of claim 5, further comprising:

severing the filament after the amount of filament to be removed from the reel has been removed from the reel and on to the spool body.

8. The method of claim 5, wherein, when removing the amount of filament from the spool body, the amount of filament is removed from the spool body in an axial direction toward the spool body second end.

\* \* \* \* \*